United States Patent [19]

Opitz et al.

[11] 4,078,884
[45] Mar. 14, 1978

[54] LIQUID PREPARATIONS OF REACTIVE DYESTUFFS

[75] Inventors: Konrad Opitz, Liederbach, Taunus; Ludwig Schlafer, Fischbach, Taunus; Erwin Ungermann, Steinbach, Taunus, all of Germany

[73] Assignee: Hoechst Aktiengesellschaft, Frankfurt am Main, Germany

[21] Appl. No.: 632,919

[22] Filed: Nov. 18, 1975

[30] Foreign Application Priority Data

Nov. 20, 1974 Germany .............................. 2454908

[51] Int. Cl.² .......................... D06P 1/38; C09B 27/00
[52] U.S. Cl. ........................................... 8/1 D; 8/1 P; 8/26; 8/41 R; 8/54.2; 8/76; 8/92; 8/163
[58] Field of Search ...................... 8/1 D, 1 P, 163, 26, 8/76, 79, 92

[56] References Cited

U.S. PATENT DOCUMENTS

| | | | |
|---|---|---|---|
| 3,142,668 | 7/1964 | Rattee et al. | 260/153 |
| 3,788,801 | 1/1974 | Hille et al. | 8/1 P |
| 3,990,846 | 11/1976 | Lehinant et al. | 8/163 |

FOREIGN PATENT DOCUMENTS

| | | |
|---|---|---|
| 1,150,163 | 6/1963 | Germany. |
| 7,200,983 | 8/1972 | Netherlands. |

OTHER PUBLICATIONS

K. Venkataraman, "The Chemistry of Synthetic Dyes," vol. VI—Reactive Dyes (Academic, 1972) pp. 327–449.

*Primary Examiner*—A. Lionel Clingman
*Attorney, Agent, or Firm*—Curtis, Morris & Safford

[57] ABSTRACT

Liquid aqueous dyeing preparations of fiber-reactive dyestuffs consisting of
  a. a total of from 5 to 35 percent by weight of the two dyestuffs corresponding in the form of the free acids to the formulae (I) and (II)

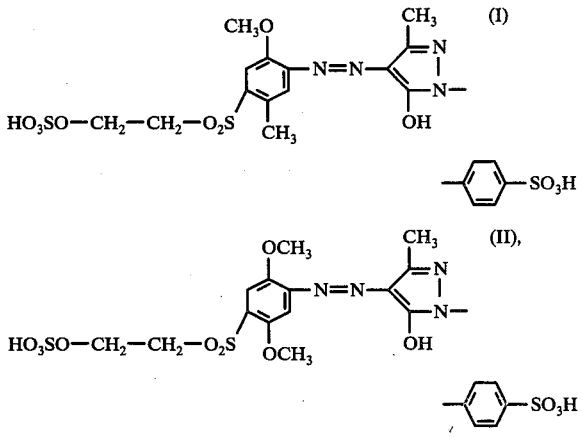

b. from 1 to 5 percent by weight of buffer substances not capable of being reacted chemically with the fiber-reactive grouping of the said dyestuffs, and
  c. from 94 to 60 percent by weight of water, and having a pH-value between 3 and 7, said dyeing preparations being suitable for the dyeing or printing of wool, silk, fibrous materials consisting of polyamides, native or regenerated cellulose or blends of fibers containing one or more of the said fibrous materials.

2 Claims, No Drawings

LIQUID PREPARATIONS OF REACTIVE DYESTUFFS

The present invention relates to liquid preparations of reactive dyestuffs.

The present invention provides liquid aqueous dyeing preparations of two reactive dyestuffs which, in the form of the free acid, correspond to the formula (I)

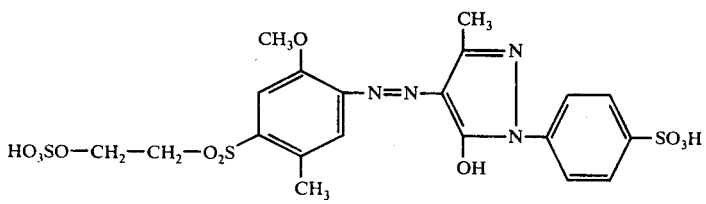

(I)

and to the formula (II)

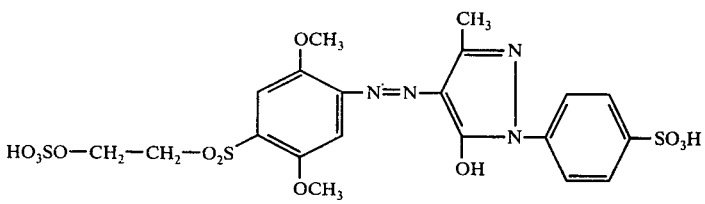

(II)

The dyeing preparations contain the above-mentioned dyestuffs, preferably the alkali metal salts, in particular the sodium salts thereof, in a molar ratio of from 1 : 8 to 8 : 1, preferaly 1 : 4 to 4 : 1, in particular in a molar ratio of from 1 : 2 to 2 : 1, in an aqueous solution in a total concentration of from 5 to 35% by weight, preferably from 15 to 30% weight, calculated on the pure dyestuffs of the formulae (I) and (II), they show a pH value in the range of from 3 to 7, preferably from 5.5 to 6.8, and they also contain from 1 to 5% by weight of buffer substances.

These dyestuffs of the formulae (I) and (II) have been known from the Examples 1 and 2 of German Offenlegungsschrift No. 1,150,163.

After their synthesis, water-soluble reactive dyestuffs are commonly isolated by salting out from the aqueous reaction solution; the precipitated salt-dyestuff mixture is suction-filtered and the press cake obtained is dried. Another technically common method for isolating the dissolved dyestuff, which is usually easy to dissolve in water, from the synthesis solution is direct drying, for example spray drying, of the preparation solution.

For the desired dyeing purpose, the salt-containing dyestuff powder is usually adjusted, after the drying process, to a specific dyestuff content by the admixture of neutral inorganic salts, for example sodium sulfate.

However, these common powder formulations of reactive dyestuffs have several drawbacks which are due, in particular, to dust formation by these pulverulent dyeing preparations when they are being handled, for example during emptying or refilling of containers, weighing and measuring, or in the preparation of dye baths or printing pastes. The dust formation is not only annoying for the workers in the manufacturing plant or the application unit, but in the dyeing or printing process it may also lead to unpleasant colour specks on the undyed or dyed material, due to settling of the dyestuff dust. However, dust removal of pulverulent dyestuffs by means of the common dust removing agents based on minerals oils always involves the risk of oily deposits in the dyeing and printing operations, which leads to stained, and thus useless, dyeings and printings. Moreover, these pulverulent dyestuffs often prevent the application of rationalization measures which are technically desirable, for example continuous dyeing processes or automatic measuring and weighing devices.

The liquid dyestuff preparations of the two dyestuffs of formulae (I) and (II) of the invention, completely avoid these drawbacks which are equally true for the above-mentioned pulverulent dyestuffs of the formulae (I) and (II) and/or the mixtures thereof and, moreover, have the advantage, both for the dyestuff producers and those who use them, in comparison with the pulverulent dyestuff formulations, that the salt charge of the waste water is considerably reduced.

The novel liquid dyeing preparations according to the invention which contain the two dyestuffs of formulae (I) and (II) are generally prepared in such a manner that the clarified dyestuff solutions obtained in the synthesis are used directly, and are advantageously adjusted to a desired higher dyestuff content either by concentration, for example by distillation of a part of the water in vacuo, or advantageously by adding a dried, for example spray-dried, proportion of the same clarified dyestuff solutions obtained in the synthesis, in which process buffer substances are added to the dyestuff solution in all cases. The dyestuff solutions of the individual dyestuffs may be mixed with each other for this purpose at any time after the synthesis. It is also possible to prepare the two dyestuffs in a single reaction mixture by reacting 2 moles of the coupling component with a total of 2 moles of the two diazo components in the desired molar ratio simultaneously or successively. The two aniline derivatives may also be diazotized in a mixture.

For the preparation of the dyeing preparations according to the invention which contain up to 35% by weight of total dyestuff, it is advantageous to use aqueous clarified dyestuff solutions, which have a content of inert salts, such as sodium sulfate or sodium chloride, that is a low as possible and is less than 50% by weight of the dyestuff content of these dyestuff solutions obtained in the synthesis. For the preparation of dyeing preparations having a lower dyestuff content, such as those containing up to 15% by weight of dyestuff, the inert salt content of the starting solutions should be lower than the dyestuff content. Generally the inert salt content of the aquous dyestuff solutions obtained in the synthesis is below these limits. In order to keep the inert salt content below these limits in the case of solutions of reactive dyestuffs where the β-sulfatoethylsulfonyl group has been obtained by esterification of a β-hydroxyethylsulfonyl group with concentrated sulfuric acid, the excess sulfuric acid necessary for the formation of this sulfuric acid semi-ester group cannot be neutralized with sodium hydroxide solution or other reagents which lead to the formation of easily soluble inert salts. It is recommended, rather, to neutralize the excess sulfuric acid with calcium carbonate and to separate the dyestuff solution from the sparingly soluble calcium sulfate by filtration. This process has been described, inter alia, in German Offenlegungsschriften Nos. 1.995.849 (Example 1), 2.049.664 (Example 1), and 2.060.081 (Example 2).

The solutions of the individual dyestuffs of the formulae (I) and (II) or their mixtures obtained in the synthesis contain from 5 to 15% by weight of individual and/or total dyestuff. As mentioned above the dyestuff content may be adjusted to about 30 - 35% by weight by the addition of dried dyestuff or by the distillation of water in vacuo.

For the dyestuff producer, it is no longer necessary to handle the mother liquors which have a very high salt content and which are partially saturated with salt; for those who use the dyestuffs, the salt content of the waste water is considerably reduced, since the large amounts of salt are used for the adjustment of the dyestuff powders are no longer required in the preparation of the liquid formulations according to the invention.

For the dyeing preparations of the invention, all buffer substances that do not react chemically with the β-sulfatoethylsulfonyl group or the vinylsulfonyl analog thereof (which reaction would lead to a reduced dyestuff yield) are suitable; examples are: sodium and potassium acetate, sodium and potassium oxalate, the acid sodium and potassium salts of phosphoric acid, mixtures of the different sodium or potassium salts of phosphoric acid, and sodium borate. Preferred buffers are sodium borate, disodium-hydrogenophosphate, and sodium-dihydrogenophosphate.

The mechanism of the reaction of reactive dyestuffs of the above-mentioned type with cellulose fibers is generally known. The formation of a covalent bond between the fiber substrate and the dyestuff molecule according to the reaction (4) of the scheme shown below, after conversion of the β-sulfatoethylsulfonyl group into the vinyl-sulfone group in the presence of alkaline agents (reaction (1)), leads to the known good fastness properties of dyeings and prints produced with these reactive dyestuffs.

It is also known from the application of the reactive dyetuffs containing the β-sulfatoethyl-sulfonyl group that this reactive group, or the corresponding vinyl-sulfonyl group, reacts with water — not only in the presence of alkalis but also in the acid range — and that this reaction is concurrent with the dyeing reaction (4) itself, proceeds according to reactions (2) or (3) of the scheme, and results in the formation of the β-hydroxyethyl-sulfonyl group, which is slow to react with the fiber substrate.

Scheme:

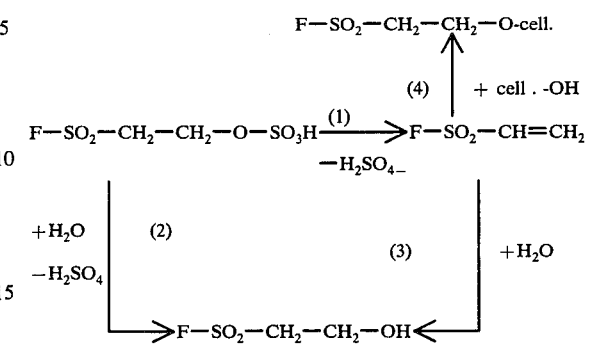

wherein F represents the radical of a dyestuff molecule, and cell-OH stands for the cellulose.

The hydrolysis (2) and the addition of water (3) are practically irreversible under dyeing conditions and thus reduce the dyestuff yield.

For this reason, the manufacture of water-soluble reactive dyestuffs is generally effected in such a way that the separation and drying of the reactive dyestuffs from the synthesis solution — which processes have been mentioned above — are carried out immediately after the synthesis, in order to avoid a reduction of the tinctorial strength due to the above-specified reasons.

Thus, it was even more surprising to find that neutral to slightly acid aqueous buffered solutions containing the two reactive dyestuffs (I) and (II) can be stored over a fairly long time without a reduction in their tinctorial strength. Aqueous solutions of the dyestuffs of formulae (I) and (II) according to the invention yield dyeings and prints of an unaltered tinctorial strength, even after a storage of several months, for example, 6 months, at room temperature or after a storage of several weeks, for example 8 weeks, at a temperature of 50° C.

The dyeing preparations of the invention are suitable for the dyeing and printing of fiber materials on the basis of wool, silk, polyamide and natural or regenerated cellulose, or on the basis of fiber mixtures containing one or several of the types of fiber mentioned, according to the process which is common for reactive dyestuffs and which is generally known, after dilution with water and, optionally, after the addition of common dyeing auxiliary agents, or in corresponding manner, after the addition of thickening agents common in the printing process and, optionally, of printing auxiliary agents.

The following Examples serve to illustrate the invention.

EXAMPLE 1

100 Parts by weight of an aqueous clarified dyestuff solution of the dyestuff of the above formula (I) having a pH value of 5.8 and a dyestuff content of 12% by weight and 72.7 parts by weight of an aqueous clarified dyestuff solution of the dyestuff of the above formula (II) having a pH value of 5.7 and a dyestuff content of 13% by weight, which solutions had been obtained in usual manner in the synthesis of the dyestuffs by diazotizing and coupling corresponding starting compounds, were combined and were mixed, while being stirred and heated at 80° C, with 27 parts by weight of a dry dyestuff powder of the dyestuff (I) having a dyestuff content of 77% be weight and with 31.5 parts by weight of a dry dyestuff powder of the dyestuff of the formula (II) having a dyestuff content of 55% by weight, the powders having been obtained by spray drying other parts of the same clarified dyestuff solutions. The 231.2 parts by weight thus obtained of an aqueous solution having a pH value of 5.8 and containing 14.8% by weight of pure dyestuff of the formula (I) and 10.7% by weight of pure dyestuff of the formula (II), i.e., a total of 25.5% by weight of pure dyestuff, yielded, after cooling and after the addition of 5 parts by weight of disodiumhydrogenophosphate, an aqueous dyeing preparation having a total content of pure dyestuff of 25% by weight and a pH value of 6.2.

Using 2 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with a mixture of 1 part by weight each of a powder formulation containing 29% by weight of pure dyestuff (I) and a formulation containing 21% by weight of pure dyestuff (II).

This tinctorial strength of the prints and dyeings was maintained unaltered when the above-mentioned novel aqueous preparation was stored at 20° C for 3 months in closed vessel.

EXAMPLE 2

100 Parts by weight of an aqueous clarified dyestuff solution of the dyestuff of the formula (I) having a pH value of 5.8 and a dyestuff content of 12% by weight and 100 parts by weight of an aqueous clarified dyestuff solution of the dyestuff of the formula (II) having a pH value of 5.6 and a dyestuff content of 13% by weight, which solutions had been obtained in usual manner in the synthesis of the dyestuffs by diazotizing and coupling corresponding starting compounds, were combined and were mixed, while being stirred and heated at 80° C, with 27 parts by weight of a dry dyestuff powder of the dyestuff of the formula (I) having a dyestuff content of 77% by weight and with 43 parts by weight of a dry dyestuff powder of the dyestuff (II), the powders having been obtained by spray drying other parts of the same clarified dyestuff solutions. The 270 parts by weight thus obtained of an aqueous dyestuff solution having a pH value of 5.8 and containing a total of 25.5% by weight of pure dyestuffs yielded, after cooling and after the addition of 6 parts by weight of disodiumhydrogenophosphate, an aqueous dyeing preparation having a total content of pure dyestuff of 25% by weight and a pH value of 6.2.

Using 2 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with a mixture of 1 part by weight each of a powder formulation containing 29% by weight of pure dyestuff (I) and a formulation containing 21% by weight of pure dyestuff (II).

This tinctorial strength of the prints and dyeings was maintained unaltered when the above-mentioned novel aqueous preparation was stored for 6 weeks at 50° C in a closed vessel.

EXAMPLE 3

200 Parts by weight of an aqueous clarified dyestuff solution of the dyestuff of the formula (I) having a pH value of 5.8 and a dyestuff content of 12% by weight and 134 parts by weight of an aqueous clarified dyestuff solution of the dyestuff of the formula (II) having a pH value of 5.7 and a dyestuff content of 13% by weight, which solutions had been obtained in usual manner in the synthesis of the dyestuffs by diazotizing and coupling corresponding starting compounds, were combined and were mixed with 4 parts by weight of disodiumhydrogenophosphate. Of this dyestuff solution, 172 parts by weight of water were distilled off, while stirring at 60° C and under a vacuum of 18 Torr. 166 Parts by weight of an aqueous dyeing preparation were obtained which had a content of pure dyestuff of 25% by weight and a pH value of 6.0 at 20° C.

Using 2 parts by weight of this solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 1 part by weight of a powder formulation containing 29% by weight of pure dyestuff (I) and 21% by weight of pure dyestuff (II).

This tinctorial strength of the prints and dyeing was maintained unaltered when the above-mentioned novel aqueous preparation was stored for 6 weeks at 20° C in a closed vessel.

EXAMPLE 4

100 Parts by weight of an aqueous clarified dyestuff solution of the dyestuff of the formula (I) having a pH value of 5.8 and dyestuff content of 12% by weight and 100 parts by weight of an aqueous clarified dyestuff solution of the dyestuff of the formula (I) having a pH value of 5.7 and a dyestuff content of 13% by weight, which solutions had been obtained in usual manner in the synthesis of the dyestuffs by diazotizing and coupling corresponding starting compounds, were combined and were mixed, while being stirred and heated at 80° C, with 27 parts by weight of a dry dyestuff powder of the dyestuff of the formula (I) having a dyestuff content of 77% by weight and with 43 parts by weight of a dry dyestuff powder of the dyestuff of the formula (II) having a dyestuff content of 55% by weight, the powders having been obtained by spray drying other parts of the same clarified dyestuff solutions. The 270 parts by weight thus obtained of an aqueous solution having a pH value of 5.8 and containing a total of 25.5% by weight of pure dyestuffs yielded, after cooling and after the addition of 6 parts by weight of sodium borate, an aqueous dyeing preparation having a total content of pure dyestuff of 25% by weight and a pH value of 6.0.

Using 2 parts by weight of this pH-stabilized solution, dye baths, padding liquors and printing pastes were prepared each time according to known and common processes which — when applied onto cotton and fixed according to methods common for reactive dyestuffs — yielded yellow dyeings and prints which had the same tinctorial strength as those prepared while using accordingly dye baths, padding liquors or printing pastes of the same concentration, with 2 parts by weight of a powder formulation containing 25% by weight each of pure dyestuff of the two dyestuffs (I) and (II).

This tinctorial strength of the prints and dyeings was maintained unaltered when the above-mentioned novel aqueous preparation was stored for 3 months at 20° C in a closed vessel.

We claim:

1. Liquid aqueous dyeing preparations of fiber-reactive dyestuffs consisting essentially of
   a. a total of from 5 to 35 percent by weight of the two dyestuffs corresponding in the form of the free acids to the formulae (I) and (II)

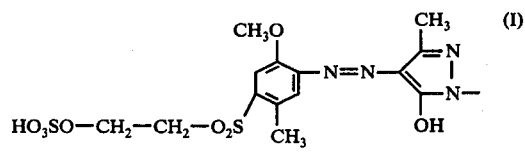

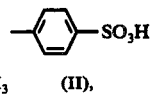

-continued

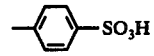

b. from 1 to 5 percent by weight of buffer substances not capable of being reacted chemically with the fiber-reactive grouping of the said dyestuffs, and
   c. from 94 to 60 percent by weight of water, and having a pH-value between 3 and 7.

2. Liquid aqueous dyeing preparation as defined in claim 1 and containing, as a buffer substance, sodium acetate, potassium acetate, sodium oxalate, potassium oxalate, sodium borate, an acid sodium salt of phosphoric acid, an acid potassium salt of phosphoric acid, or a mixture thereof.

* * * * *